US008838173B2

(12) United States Patent
Son et al.

(10) Patent No.: US 8,838,173 B2
(45) Date of Patent: Sep. 16, 2014

(54) CALIBRATION APPARATUS AND SYSTEM OF PORTABLE TERMINAL

(75) Inventors: Je Hyun Son, Suwon-si (KR); Youn Seok Kim, Suwon-si (KR); Min Seok Kim, Hwaseong-si (KR); Ju Gab Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 22 days.

(21) Appl. No.: 13/470,557

(22) Filed: May 14, 2012

(65) Prior Publication Data

US 2012/0295663 A1 Nov. 22, 2012

(30) Foreign Application Priority Data

May 19, 2011 (KR) .......................... 10-2011-0047256

(51) Int. Cl.
*H04B 1/38* (2006.01)
*H04W 24/06* (2009.01)
*H04W 88/02* (2009.01)

(52) U.S. Cl.
CPC .............. *H04W 24/06* (2013.01); *H04W 88/02* (2013.01)
USPC ............ 455/557; 455/423; 455/424; 455/425

(58) Field of Classification Search
CPC ..... H04W 24/06; H04W 88/02; G01N 17/00; G01N 2021/1725; G01N 21/1717; G01N 27/22; G01N 27/223; G01N 1/067
USPC .......................................... 455/423–425, 557
See application file for complete search history.

(56) References Cited

U.S. PATENT DOCUMENTS

| 6,832,075 B1 * | 12/2004 | Henry, Jr. ................... 455/67.14 |
| 2001/0023176 A1 * | 9/2001 | Talvitie et al. ............... 455/67.4 |
| 2004/0119487 A1 * | 6/2004 | Song et al. .................... 324/758 |
| 2006/0240815 A1 * | 10/2006 | Shim et al. .................... 455/423 |
| 2012/0057525 A1 * | 3/2012 | Hou .............................. 370/328 |

\* cited by examiner

*Primary Examiner* — Olumide T Ajibade Akonai
*Assistant Examiner* — Edward Zhang
(74) *Attorney, Agent, or Firm* — Jefferson IP Law, LLP

(57) ABSTRACT

A calibration apparatus of a portable terminal capable of performing calibration without disassembling a case of the portable terminal without a cable insertion hole in the case, and a system thereof are provided. The calibration system includes a calibration jig, including a cable coupler in which a Radio Frequency (RF) cable is inserted, for insertion in a user identification card slot unit of the portable terminal which connects a wireless path between an RF communication unit of the portable terminal and the calibration jig, and blocks a second wireless path between the RF communication unit and an antenna, a measuring device for connecting with the calibration jig through the RF cable, and for exchanging a wireless signal with the RF communication unit through the first wireless path, and a computer for connecting with the measuring device and the portable terminal, and for controlling a calibration procedure of the portable terminal.

19 Claims, 4 Drawing Sheets

CALIBRATION APPARATUS AND SYSTEM OF PORTABLE TERMINAL

PRIORITY

This application claims the benefit under 35 U.S.C. §119 (a) of a Korean patent application filed on May 19, 2011 in the Korean Intellectual Property Office and assigned Serial No. 10-2011-0047256, the entire disclosure of which is hereby incorporated by reference.

BACKGROUND OF THE INVENTION

1. Field of the Invention

The present invention relates to a calibration apparatus and system. More particularly, the present invention relates to a calibration apparatus using a user identification card slot unit and a system thereof.

2. Description of the Related Art

With advanced development of information and communication technology and computer technology, the supply and use of portable terminals, which have become a modern necessity, have rapidly increased. Such portable terminals include a Radio Frequency (RF) communication unit for providing wireless communication, such as a voice call or a video phone call. Meanwhile, although portable terminals use the same components, because characteristics of the components differ from each other, a deviation may be caused in the performance of the RF communication unit. The performance deviation of the RF communication unit may occur due to non-linearity of components used for the RF communication unit. To correct the deviation of the RF communication unit, respective manufacturing companies may perform calibration of the RF communication unit in a manufacturing process. As time goes by, if the performance of the RF communication unit deteriorates due to degradation of the components, calibration of the RF communication unit may be performed during a service stage.

For the calibration, the RF communication unit of the portable terminal should connect with a measuring device functioning as a base station through an RF cable. In order to connect the RF communication unit with the measuring device, a portable terminal of the related art has an RF switch between an antenna and an RF communication unit therein. In a state where the portable terminal is completely assembled, to connect the RF cable with the RF switch, a cable insertion hole is formed in the portable terminal of the related art, and the RF cable may be inserted in the cable insertion hole. However, when the cable insertion hole is formed in the case, dust introduction or water introduction occurs through the cable insertion hole. To address this problem, portable terminals without a cable insertion hole in a case have been developed. However, in a case of a portable terminal without the cable insertion hole in the case, a user should disassemble the case of the portable terminal to perform calibration of the RF communication unit.

Therefore, a need exists for a calibration apparatus of a portable terminal capable of performing calibration without disassembling a case of a portable terminal without a cable insertion hole in the case, and a system thereof.

SUMMARY OF THE INVENTION

Aspects of the present invention are to address at least the above-mentioned problems and/or disadvantages and to provide at least the advantages described below. Accordingly, an aspect of the present invention is to provide a calibration apparatus of a portable terminal capable of performing calibration without disassembling a case of a portable terminal without a cable insertion hole in the case, and a system thereof.

In accordance with an aspect of the present invention, a calibration system is provided. The calibration system includes a calibration jig, including a cable coupler in which a Radio Frequency (RF) cable is inserted, for insertion in a user identification card slot unit of a portable terminal, wherein the portable terminal connects a wireless path between an RF communication unit of the portable terminal and the calibration jig when the calibration jig is inserted, and blocks a second wireless path between the RF communication unit and an antenna, a measuring device for connecting with the calibration jig through the RF cable, and for exchanging a wireless signal with the RF communication unit through the first wireless path, and a computer for connecting with the measuring device and the portable terminal, and for controlling a calibration procedure of the portable terminal.

In accordance with another aspect of the present invention, a calibration apparatus of a portable terminal is provided. The calibration apparatus includes an RF communication unit for exchanging a wireless signal with a measuring device when a calibration jig is inserted, and a user identification card slot unit for switching between a first wireless path and a second wireless path, wherein the calibration jig is inserted in the user identification card slot unit.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
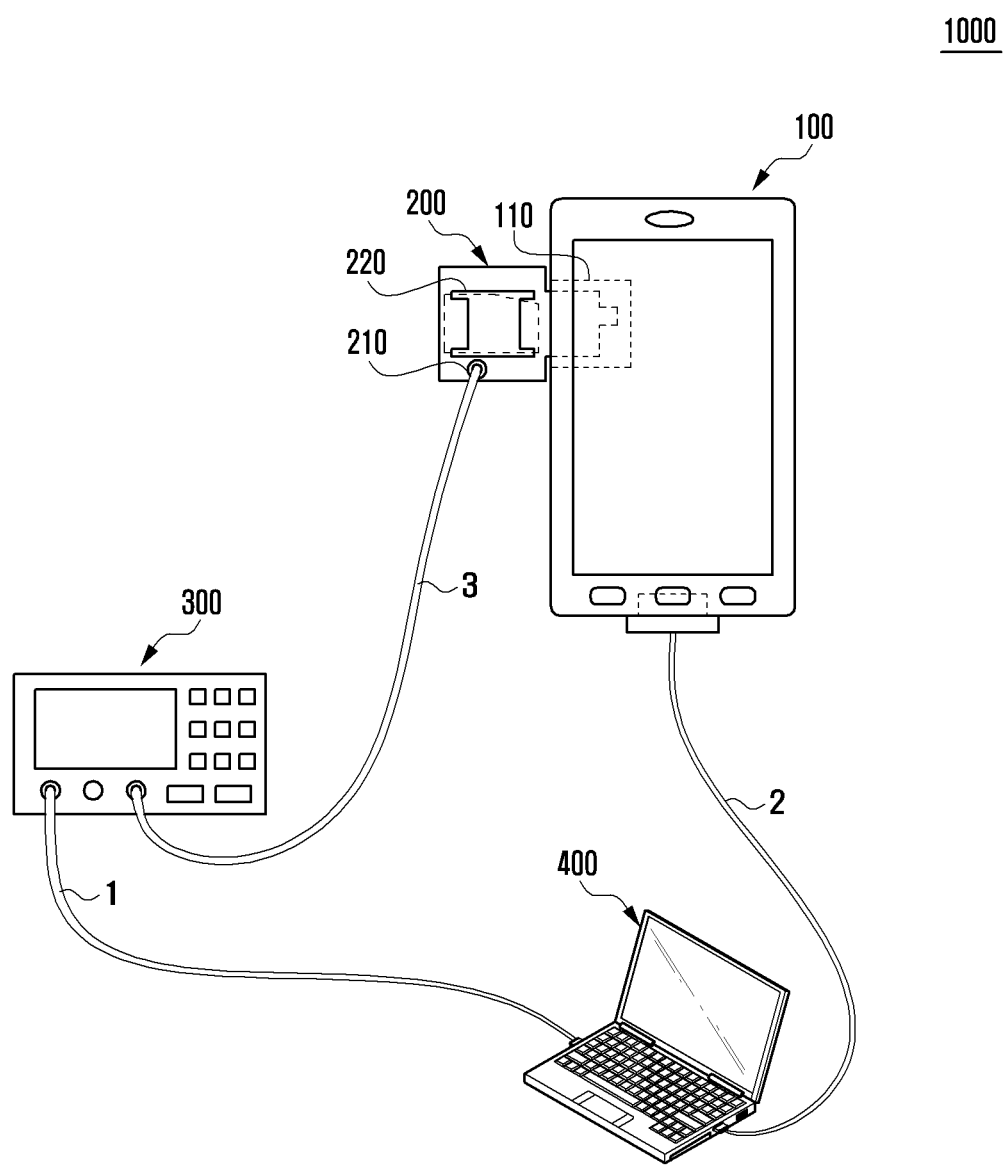
FIG. 1 is a schematic diagram illustrating a configuration of a calibration system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

As used herein, the term "first user identification card slot" means a user identification card slot formed in a portable terminal, and the term "second user identification card slot" means a user identification card slot formed in a calibration jig.

The "user identification card" is a device for storing subscriber authentication information. The user identification card, as described hereinafter, may be a Subscriber Identity Module (SIM), a Universal Subscriber Identity Module (USIM), a User Identity Module (UIM), and a Removable User Identification Module (RUIM).

FIGS. 1 through 4, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

FIG. 1 is a schematic diagram illustrating a configuration of a calibration system according to an exemplary embodiment of the present invention.

Referring to FIG. 1, a calibration system 1000 may include a portable terminal 100, a calibration jig 200, a measuring device 300, and a computer 400.

The computer 400 may control a calibration procedure of a Radio Frequency (RF) communication (not shown) of a portable terminal 100. To do this, the computer 400 may store an application program for performing calibration. The computer 400 may connect with the portable terminal 100 and the measuring device 300. For example, the computer 400 may connect with the measuring device 300 through a first cable 1, for example, a General Purpose Interface Bus (GPIB) cable, and with the portable terminal 100 through a second cable 2, for example, a Universal Serial Bus (USB) or a Universal Asynchronous Receiver/Transmitter (UART) cable.

The measuring device 300 connects with a calibration jig 200 through an RF cable 3, and may exchange a wireless signal with an RF communication unit (not shown) of the portable terminal 100 through the calibration jig 200. That is, the measuring device 300 may perform a function of a base station at the calibration time. More specifically, the measuring device 300 may exchange the wireless signal with the RF communication unit (not shown) through a first wireless path formed when the calibration jig 200 is inserted into a user identification card slot unit 110. The first wireless path will be described below.

The portable terminal 100 is includes an RF communication unit (not shown) for providing a wireless communication function, and may be a mobile communication terminal, i.e., a Personal Digital Assistant (PDA), a Smart Phone, a Tablet PC, and the like. More particularly, the portable terminal 100 may perform calibration using a user identification card slot unit 110 in which a user identification card is inserted. To do this, the user identification card slot unit 110 may include a first user identification card slot (not shown) and a switching unit (not shown). A user identification card or a calibration jig 200 is inserted in the first user identification card slot. When the calibration jig 200 is inserted into the first user identification card slot, the switching unit connects a first wireless path between the RF communication unit and the calibration jig 200, and blocks a second wireless path between the RF communication unit and an antenna (not shown). In contrast, when the calibration jig 200 is not inserted into the first user identification card slot, the switching unit of the portable terminal 100 may block a first wireless path but connect a second wireless path. Furthermore, the user identification card slot unit 110 may include a first connection terminal (not shown) connected with a side of the switching unit. Moreover, the portable terminal 100 may include an interface unit (e.g., a Universal Serial Bus (USB) connector or a Universal Asynchronous Receiver/Transmitter (UART) connector) for forming a communication channel with the computer 400 for controlling calibration. A description of the portable terminal 100 will be given with reference to FIGS. 2 and 3.

The calibration jig 200 may perform a function of a medium connecting the measuring device 300 with the RF communication unit of the portable terminal 100. To do this, the calibration jig 200 may include a cable connector 210 for connecting the RF cable 3 to a side thereof, and a part of the calibration jig 200 may be inserted into the user identification card slot unit 110. The calibration jig 200 may include a second user identification card slot 220 capable of receiving a user identification card. That is why the user identification card cannot be inserted in the portable terminal when the calibration jig 200 is inserted into the user identification card slot unit 110. The calibration jig 200 will be illustrated with reference to FIG. 2.

In an exemplary embodiment of the present invention, a calibration jig 200 connectable to an RF cable 3 may be inserted into a user identification card slot unit 110 of the portable terminal 100 to perform calibration of the RF communication unit. Accordingly, an exemplary embodiment of the present invention may easily perform calibration of the portable terminal 100 without a cable insertion hole for inserting an RF cable in a case without disassembling the case.

Although not shown in FIG. 1, the calibration system 1000 is disposed between the portable terminal 100 and the computer 400, and may further include a power supply unit for supplying power to the portable terminal 100 under the control of the computer 400.

Figure 2:
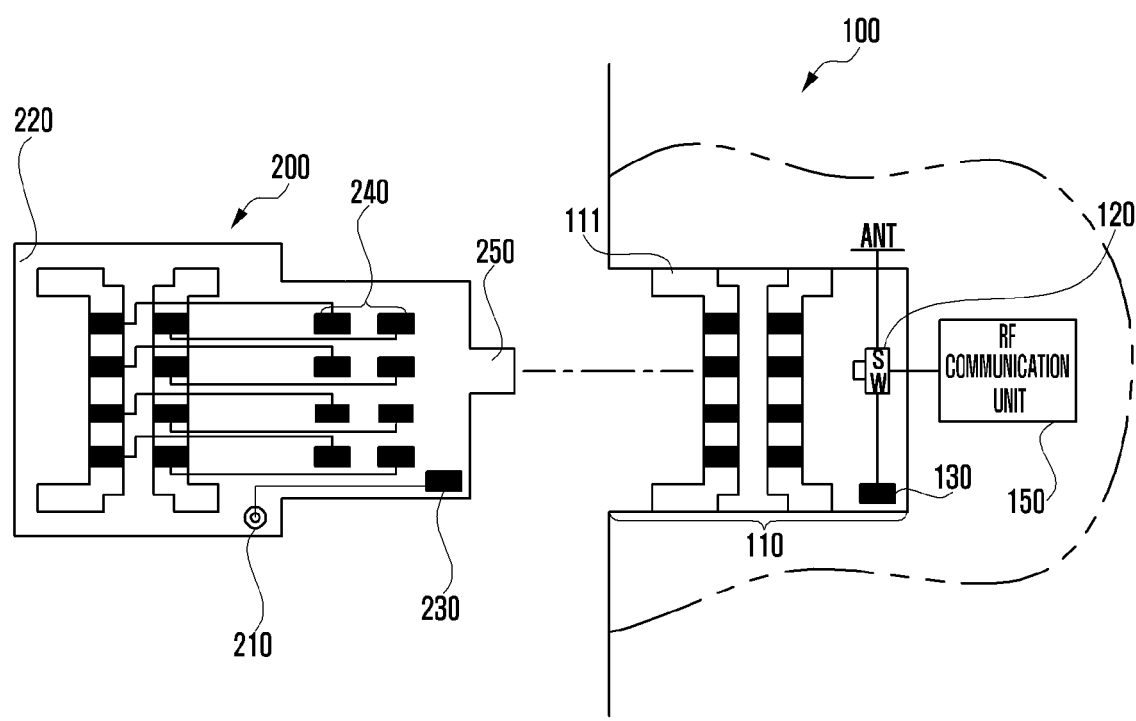
FIG. 2 illustrates a calibration jig and a user identification card slot unit according to an exemplary embodiment of the present invention.
Figure 3:
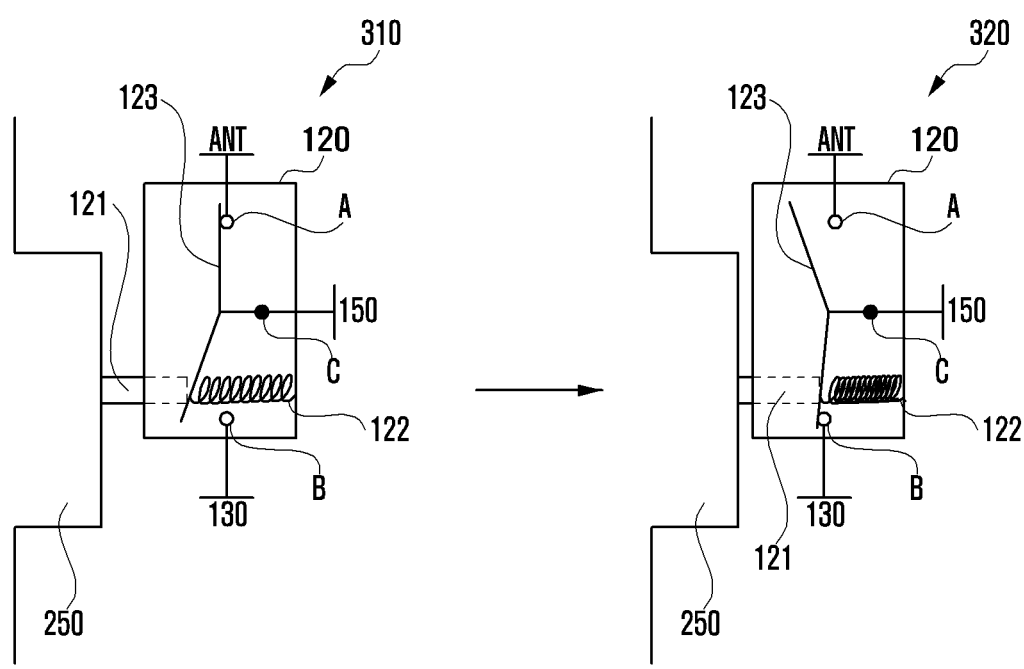
FIG. 3 illustrates a switching unit according to an exemplary embodiment of the present invention.

FIG. 2 illustrates a calibration jig and a user identification card slot unit according to an exemplary embodiment of the present invention. FIG. 3 illustrates a switching unit according to an exemplary embodiment of the present invention.

Referring to FIGS. 1 through 3, the portable terminal 100 may include a user identification card slot unit 110 and an RF communication unit 150. The user identification card slot unit 110 may include a first user identification card slot 111, a switching unit 120, and a first connection terminal 130.

The RF communication unit 150 may form a channel for a call (i.e., a voice call, a video phone call, etc.) with a base station and a data communication channel for transmitting data. For example, the RF communication unit 150 may transmit a voice signal and an image signal to another terminal, and receive a voice signal and an image signal from another terminal. The RF communication unit 150 may include an RF transmitter (not shown) for up-converting a frequency of a transmitted signal and for amplifying the signal, an RF receiver (not shown) for low-noise-amplifying a received signal and for down-converting the signal, and a transmission/reception separator (not shown) for separating the received signal and the transmitted signal. The RF communication unit 150 needs calibration due to non-linear characteristic of components and component deviation. More particularly, when the calibration jig 200 is inserted, the RF communication unit 150 may exchange a wireless signal with the measuring device 300. In contrast, when the calibration jig 200 is not inserted, the RF communication unit 150 may exchange the wireless signal with a base station through an antenna.

A user identification card or a calibration jig 200 may be inserted into the first user identification card slot 111. When the calibration jig 200 is inserted, terminals of the first user identification card slot 111 may contact with terminals of a coupling terminal unit 240, respectively. That is, since a calibration jig 200 is inserted into the first user identification card slot 111 where the user identification card is inserted into the second user identification card slot 220, an exemplary embodiment of the present invention may provide the same effect as that when a user identification card is inserted into the first user identification card slot 111.

The switching unit 120 may switch between a first wireless path and a second wireless path according to whether the calibration jig 200 is inserted. In this case, the first wireless path is a connecting path of the RF communication unit 150, the switching unit 120, a first connection terminal 130, a second connection terminal 230, a cable coupler 210, an RF cable 3, and a measuring device 300. The second wireless path is a connecting path of the RF communication unit 150, the switching unit 120, and the antenna ANT.

Referring to FIG. 3, a switching unit 120 may include a first output terminal A connected to the antenna ANT, a second output terminal B connected to the first connection terminal 130, and an input terminal C connected to the RF communication unit 150. The switching unit 120 may include a switch 123, a button 121, and an elastic member 122 for pressurizing the button 121 and the switch 123 in a predefined direction. When the calibration jig 200 is not inserted, as illustrated in reference numeral 310 of FIG. 3, in a switch 123 of the switching unit 120, the input terminal C and the first output terminal A are connected to each other by an elastic member 122. In contrast, when the calibration jig 200 is inserted into the first user identification card slot 111, as illustrated in reference numeral 320 of FIG. 3, a projection 250 of the calibration jig 200 pressurizes one side of the button 121. In this case, another side of the button 121 pressurizes the switch 123 to connect the input terminal C with the second output terminal B. As illustrated above, the switching unit 120 may be switched to connect the input terminal C with the first output terminal A or the second output terminal B according to presence of the calibration jig 200. The switching unit 120 shown in FIG. 3 is merely exemplary and exemplary embodiments of present invention are not limited thereto. That is, it will be apparent to those skilled in the art that the switching unit 120 may be formed in various types.

The first connection terminal 130 connects with the second output terminal B of the switching unit 120, and may contact with the second connection terminal 230 when the calibration jig 200 is inserted. FIG. 2 shows that the first connection terminal 130 is separately provided. However, exemplary embodiments of the present invention are not limited thereto. For example, the first connection terminal 130 may be configured by a reserved terminal that is not used among terminals of the first user identification card slot 111.

The foregoing exemplary embodiment has illustrated that the first user identification card slot 111, the switching unit 120, and the first connection terminal 130 are integrally formed. However, exemplary embodiments of the present invention are not limited thereto. For example, in an exemplary implementation, the first user identification card slot 111, the switching unit 120, and the first connection terminal 130 may be provided as separate elements.

Referring to FIG. 2, the calibration jig 200 will be described. The calibration jig 200 may include the cable coupler 210, the second user identification card slot 220, the second connection terminal 230, the coupling terminal unit 240, and the projection 250.

The second connection terminal 230 connects with the cable coupler 210. When the calibration jig 200 is inserted into the first user identification card slot 111, the second connection terminal 230 connects with the first connection terminal 130 of the portable terminal 100 to connect the cable coupler 210 with the second output terminal B of the switching unit 120.

The user identification card may be inserted into the second user identification card slot 220. The coupling terminal unit 240 may include a plurality of coupling terminals connected to terminals of the second user identification card 220, respectively. When the calibration jig 200 is inserted into the first user identification card slot 111, the coupling terminal unit 240 may contact with terminals of the first identification card slot 111. That is, the coupling terminal unit 240 may perform a function of a medium for connecting the first user identification card slot 111 with the second user identification card slot 220.

When the projection 250 is inserted into the first user identification card slot 111, it may pressurize the switching unit 120 of the portable terminal 100. More specifically, the projection 250 may pressurize the button 121 of the switching unit 120 to form a first wireless path between the RF communication unit 150 and the measuring device 300. Meanwhile, the projection 250 may be omitted. For example, in an exemplary implementation, one side surface of the calibration jig 200 is formed with a - shape, and a part of one side with the - shape may pressurize the button 121.

The foregoing exemplary embodiment has illustrated that the switching unit 120 is a physical switch operating by a physical pressurization of the calibration jig 200. However, exemplary embodiments of the present invention are not limited thereto. For example, the switching unit 120 may be configured by an electric switch. In this case, the portable terminal 100 may include a means for detecting insertion of the calibration jig 200 and a means for controlling an electric switch according to presence of the calibration jig 200. For example, the portable terminal 100 may detect insertion of a calibration jig 200 using a comparator, and connect an output terminal of the comparator with a control terminal of the electric switch to control switching of the electric switch. Furthermore, the portable terminal 100 may detect insertion of calibration jig 200 using a first General Purpose Input Output (GPIO) terminal, and control switching of the electric switch through a second GPIO terminal.

Although not shown in FIG. 2, the portable terminal 100 may control an overall operation of the portable terminal 100 and a signal flow between internal blocks of the portable terminal 100, and a USB communication module or a UART communication module for communicating with the computer 400.

Figure 4:
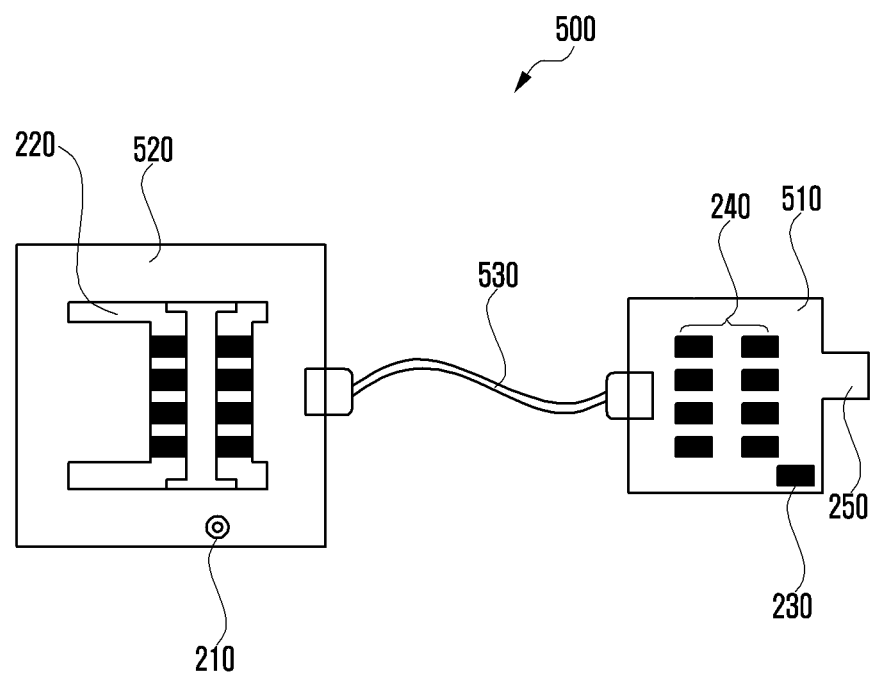
FIG. 4 illustrates a calibration jig according to an exemplary embodiment of the present invention.

FIG. 4 illustrates a calibration jig according to an exemplary embodiment of the present invention.

Referring to FIG. 4, a calibration jig 500 may include a first part 510 and a second part 520. The first part 510 may include the coupling terminal unit 240, the second connection terminal 230, and the projection 250. The first part 510 may be inserted into the first user identification card slot 111 of the portable terminal 100. The second part 520 may include the second user identification card slot 220 and the cable coupler 210. In this case, the first part 510 and the second part 520 may be connected with each other through the wired cable 530. The calibration jig 500 is divided into two parts 510 and 520 performs the same function as that of the foregoing calibration jig 200, as illustrated in FIGS. 1 through 3, except for connection by a wired cable 530. Accordingly, description of the calibration jig 500 according to an exemplary embodiment of the present invention will be omitted.

In a calibration apparatus and system of a portable terminal according to an exemplary embodiment of the present invention as mentioned above, although a cable insertion hole is not formed in a case of the portable terminal, there is no need to disassemble the case of the portable terminal for performing calibration of the portable terminal. Accordingly, exemplary embodiments of the present invention may easily perform calibration and thus reduce calibration time. In addition, since there is no demand to form a cable insertion hole in the case of the portable terminal, it may reduce restrictions in design of the portable terminal.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A calibration system comprising:
 a calibration jig, including a cable coupler in which a Radio Frequency (RF) cable is inserted, for insertion in a user identification card slot unit of a portable terminal, wherein the portable terminal connects a first wireless path between an RF communication unit of the portable terminal and the calibration jig when the calibration jig is inserted, and blocks a second wireless path between the RF communication unit and an antenna;
 a measuring device for connecting with the calibration jig through the RF cable, and for exchanging a wireless signal with the RF communication unit through the first wireless path; and
 a computer for connecting with the measuring device and the portable terminal, and for controlling a calibration procedure of the portable terminal,
 wherein the calibration jig comprises a second user identification card slot in which a user identification card is inserted.

2. The calibration system of claim 1, wherein the RF communication unit exchanges the wireless signal with the measuring device when the calibration jig is inserted, and wherein the user identification card slot unit switches between the first wireless path and the second wireless path when the calibration jig is inserted.

3. The calibration system of claim 2, wherein the user identification card slot unit comprises:
 a first user identification card slot in which a part of the calibration jig is inserted;
 a switching unit for connecting the first wireless path when the calibration jig is inserted, and for switching connection of the second wireless path when the calibration jig is not inserted; and
 a first connection terminal connected to one side of the switching unit.

4. The calibration system of claim 3, wherein, when the calibration jig is not inserted into the first user identification card slot, the switching unit of the portable terminal blocks the first wireless path and connects the second wireless path between the RF communication unit and the antenna.

5. The calibration system of claim 3, wherein the switching unit comprises:
 an input terminal connected to the RF communication unit;
 a first output terminal connected to the antenna;
 a second output terminal connected to the first connection terminal;
 a switch for connecting the input terminal to the first output terminal or the second output terminal according to presence of the calibration jig;
 an elastic member for pressuring the switch in a predefined direction to connect the input terminal with the first output terminal; and
 a button, pressurized to one side of the calibration jig when the calibration jig is inserted, for pressuring the switch to connect the input terminal with the second output terminal.

6. The calibration system of claim 3, wherein the switching unit comprises:
 an electric switch for switching between the first wireless path and the second wireless path;
 a means for detecting insertion of the calibration jig; and
 a means for controlling switching of the electric switch according to the insertion of the calibration jig.

7. The calibration system of claim 6, wherein the portable terminal detects insertion of a calibration jig based on a comparator, and connects an output terminal of the comparator with a control terminal of the electric switch to control switching of the electric switch.

8. The calibration system of claim 6, wherein the portable terminal detects the insertion of the calibration jig based on a first General Purpose Input Output (GPIO) terminal, and controls switching of the electric switch through a second GPIO terminal.

9. The calibration system of claim 1, wherein the calibration jig comprises:
 a coupling terminal unit, including a plurality of terminals connected with terminals of the second user identification card slot, for contacting with terminals of the first user identification card slot when the calibration jig is inserted into a first user identification card slot;
 a cable coupler for connecting the RF cable;
 a second connection terminal for connecting with the cable coupler and for contacting with a first connection terminal of the portable terminal when the calibration jig is inserted into the first user identification card slot of the portable terminal; and a projection for switching the first wireless path and the second wireless path when the calibration jig is inserted into the first user identification card slot of the portable terminal.

10. The calibration system of claim 9, wherein the calibration jig comprises:
   a first part, inserted in the user identification card slot unit, including the coupling terminal unit, the second connection terminal, and the projection;
   a second part including the cable coupler and the second user identification card slot; and
   a wired cable for connecting the first part to the second part.

11. The calibration system of claim 1, further comprising a power supply unit disposed between the computer and the portable terminal for supplying power to the portable terminal under control of the computer.

12. A calibration apparatus of a portable terminal comprising:
   a Radio Frequency (RF) communication unit for exchanging a wireless signal with a measuring device when a calibration jig is inserted; and
   a user identification card slot unit for switching between a first wireless path and a second wireless path,
   wherein the calibration jig is inserted in the user identification card slot unit,
   wherein the calibration jig comprises a second user identification card slot in which a user identification card is inserted, and
   wherein, when the calibration jig is not inserted into a first user identification card slot of the user identification card slot unit, a switching unit of the portable terminal blocks the first wireless path and connects the second wireless path between the RF communication unit and the antenna.

13. The calibration apparatus of claim 12, wherein the user identification card slot unit comprises:
   the first user identification card slot in which a part of the calibration jig is inserted;
   the switching unit for connecting the first wireless path when the calibration jig is inserted, and for switching connection of the second wireless path when the calibration jig is not inserted; and
   a first connection terminal connected to one side of the switching unit.

14. The calibration apparatus of claim 13, wherein the switching unit comprises:
   an input terminal connected to the RF communication unit;
   a first output terminal connected to the antenna;
   a second output terminal connected to the first connection terminal;
   a switch for connecting the input terminal to the first output terminal or the second output terminal according to presence of the calibration jig;
   an elastic member for pressuring the switch in a predefined direction to connect the input terminal with the first output terminal; and
   a button, pressurized to one side of the calibration jig when the calibration jig is inserted, for pressuring the switch to connect the input terminal with the second output terminal.

15. The calibration system of claim 13, wherein the switching unit comprises:
   an electric switch for switching between the first wireless path and the second wireless path;
   a means for detecting insertion of the calibration jig; and
   a means for controlling switching of the electric switch according to insertion of the calibration jig.

16. The calibration system of claim 15, wherein the portable terminal detects insertion of a calibration jig based on a comparator, and connects an output terminal of the comparator with a control terminal of the electric switch to control switching of the electric switch.

17. The calibration system of claim 15, wherein the portable terminal detects the insertion of the calibration jig based on a first General Purpose Input Output (GPIO) terminal, and controls switching of the electric switch through a second GPIO terminal.

18. The calibration apparatus of claim 13, further comprising an interface unit for forming a communication channel with a computer for controlling the calibration.

19. The calibration apparatus of claim 18, wherein the interface unit includes at least one of a Universal Serial Bus (USB) connector and a Universal Asynchronous Receiver/Transmitter (UART) connector.

* * * * *